United States Patent Office 3,560,446
Patented Feb. 2, 1971

3,560,446
PROCESS FOR THE PRODUCTION OF HIGH MOLECULAR WEIGHT POLYIMIDES FROM URETHANES
Wilfried Zecher, Cologne-Stammhein, and Rudolf Merten, Leverkusen, Germany, assignors to Farbenfabriken Bayer Aktiengesellschaft, Leverkusen, Germany
No Drawing. Filed July 30, 1968, Ser. No. 748,591
Claims priority, application Germany, Aug. 7, 1967, F 53,161
Int. Cl. C08g 22/00
U.S. Cl. 260—77.5
7 Claims

ABSTRACT OF THE DISCLOSURE

A process for the production of polyimides by reaction of carbamic acid esters and cyclic dicarboxylic acid anhydrides at temperatures of from 0 to 450° C.

---

The invention relates to a process for the production of polyimides by reaction of carbamic acid esters and cyclic dicarboxylic acid anhydrides.

It is already known that polyimides can be obtained by condensing diamines with tetracarboxylic acids or their anhydrides, two carboxylic groups of said tetracarboxylic acid or anhydrides being in o-position to one another. Many polyimides are particularly resistant to high temperatures and are used for example as wire lacquers and films or foils for electrical insulating purposes. Since unfortunately it is the temperature-resistant polyimides that are insoluble in the more common organic solvents, they are usually produced in two stages (cf. DAS 1,202,-981). This process is carried out with solutions of polyamide polycarboxylic acids in strongly polar solvents whose practical application unfortunately involves considerable difficulty because, for example, the insoluble polyimides are precipitated by premature cyclisation or, alternatively, water eliminated during this reaction promotes disintegration into units or fragments of low molecular weight.

It is an object of this invention to provide a process for the production of high molecular weight polyimides which comprises reacting a carbamic acid ester with a cyclic dicarboxylic acid anhydride, said reacting being effected at temperature of from 0 to 450° C. The process may optionally be carried out in the presence of a solvent. The process is preferably carried out at a temperature of from 20 to 350° C. Carbamic acid esters in the context of this invention are compounds corresponding to the general formula

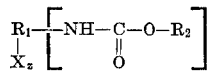

wherein $R_1$ represents a $z+1$-valent aliphatic, aliphatic-aromatic or aromatic radical, $R_2$ represents an aliphatic or aliphatic-aromatic radical, $z$ represents 1 or 2 and X represents any one of the groups

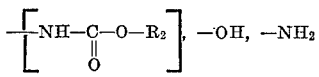

—COOH, —NCO or —COOR$_4$ wherein $R_4$ represents an aliphatic, aliphatic aromatic or aromatic radical.

Cyclic anhydrides are in particular compounds that correspond to the following general formula

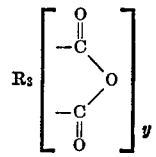

wherein $R_3$ represents a $2y$-valent aliphatic, aliphatic-aromatic or aromatic radical with two or more functional groups, and $y$ represents an integer from 1 to 3.

In the process according to the invention, the polyamines used in the prior art process, which are sensitive to oxidation and can only be purified with great difficulty, are replaced by the considerably more resistant polycarbamic acid esters. Another advantage of this reaction is that the only monomeric volatile compounds formed are carbon dioxide and alcohols. Thus, in contrast to conventional processes in which imide formation is accompanied by the elimination of water, hydrolysis of the amide or imide groups, which leads to low molecular weight components and which impairs the mechanical properties of the polymers, cannot take place. In addition, the imide group is, in most instances, formed only at fairly high temperatures, thus promoting the stability in storage of, for example, lacquer solutions.

The radicals $R_1$ and $R_3$ of the general formulae given above are preferably those based on ethane, n-butane, isobutane, tert.-butane, hexane, eicosene, propene, diethyl ether, dipropyl sulphide, cyclo-pentane, cyclo-hexane, benzene, naphthalene, diphenyl, diphenyl methane, diphenyl sulphone, diphenyl ether, 4,4'-diphenoxy diphenyl propane, toluene, o-, m- or p-xylene, tris-tolyl-methane, ethylene glycol-bisphenyl carboxylic acid ester, triaryl phosphates, polyethers, polyesters, polyacetals, polyureas, polyurethane and polyamides. They may be either mono- or polysubstituted, for example by alkyl-, halogen, nitro-, alkoxy-, aroxy-, amino-, hydroxy-, carboxy-, carboalkoxy-, carboaryloxy-, carbamido-, sulphonic acid- or cyano groups.

$R_4$ preferably has the same meaning as $R_2$, although it may also represent an aromatic radical, for example the monovalent aromatic radicals that are mentioned as being preferred in the definition of $R_1$. In particular, $R_2$ may represent phenyl or cresyl.

The radical $R_2$ is preferably derived from methane, ethane, n-butane, isobutane, tert.-butane, propane, propine, dodecane, cyclopentane, cyclohexane, polyethers, polyesters, polyacetals, polyureas, polyurethanes and polyamides and may be mono- or polysubstituted by alkyl-, aryl-, alkylimino-, arylimino-, alkylaminocarboxy-, arylaminocarboxy-, hydroxy-, carboxy-, carbamido-, carboalkoxy- or carboaryloxy- groups.

Instead of the carbamic acid esters, it is also possible to use the corresponding thiocarbamic acid esters.

The carbamic acid esters used as starting materials in accordance with the invention may be prepared by know methods, for example by the reaction of alcohols with isocyanates, optionally in the presence of catalysts. The carbamic acid esters may be used in substance or alternatively may even be prepared in the reaction medium itself from isocyanates and alcohols.

The following are examples of carbamic acid esters that may be used as starting materials in accordance with the invention:
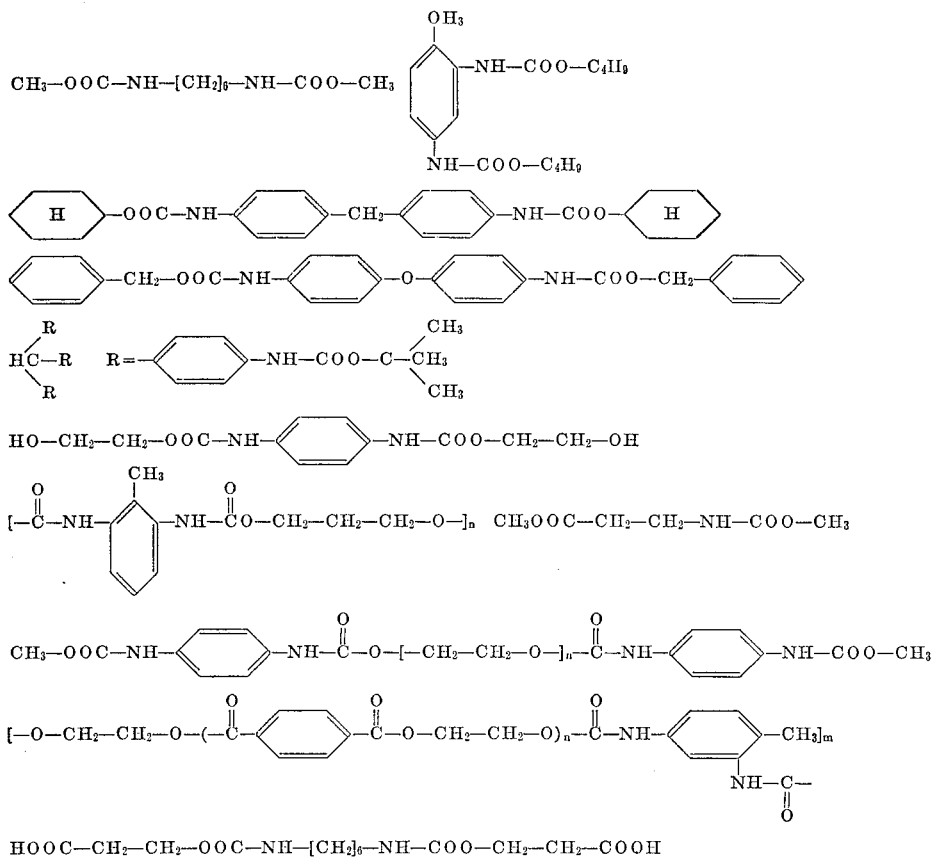
The following are examples of suitable cyclic acid anhydrides that may also be prepared by known methods;
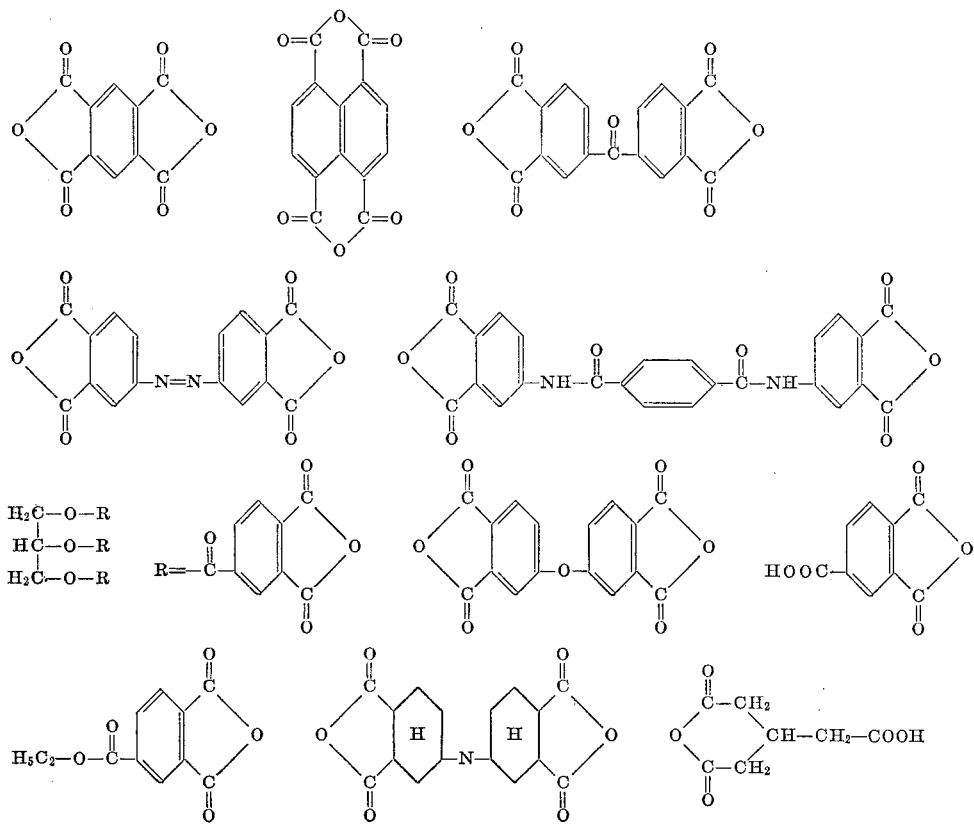

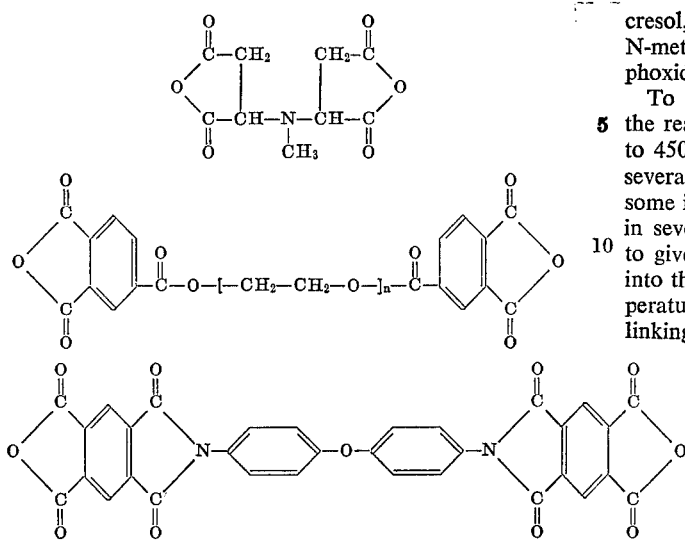

Instead of the acid anhydrides, it is also possible to use compounds which can be converted into acid anhydrides, for example phenyl esters of the corresponding dicarboxylic acids.

The reaction according to the invention is illustrated by the following example:

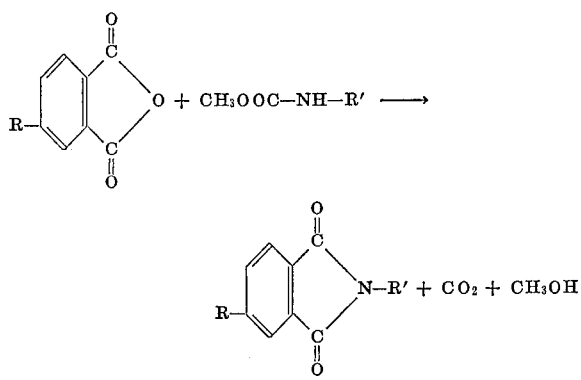

When at least bis-functional carbomic acid esters and bis-functional acid anhydrides are used as the starting materials, the monomers or oligomers are linked to the high molecular weight compound solely through imide groups. It is also possible, however, to synthesise the high molecular weight compounds from one mono-functional and one bis-functional component or from two mono-functional components, although in this case at least one other functional group must be present in them which is able to undergo polycondensation or polyaddition reactions. For example, polyamide imides can be obtained from 4,4'-bis-[butoxycarbonylamino]-diphenyl methane and trimellitic acid anhydride.

An alternative method of synthesising high molecular weight compounds from mono-functional dicarboxylic acid anhydrides and carbamic acid esters with a second reactive group, is to add other suitable polyfunctional substances, for example diamines, polyesters or polyethers with terminal OH— or acid groups, diols, triols, polycarboxylic acids and polyisocyanates. Corresponding alcohols may also be used at the same time for converting the isocyanates into the carbamic acid ester groups. For example, the corresponding polyimide esters are obtained by the process according to the invention from trimellitic acid anhydride and the polycarbamic acid ester of diphenyl methane diisocyanate and ethylene glycol.

The reaction according to the invention is generally carried out in solvents. Suitable solvents include hydrocarbons, halogenated hydrocarbons, phenols, esters, ketones, ethers, substituted amides, sulphoxides and sulphones, for example xylene, o-dichlorobenzene, phenol, cresol, acetophenone, glycol monomethyl ether acetate, N-methyl pyrrolidone, dimethyl formamide, dimethyl sulphoxide, dimethyl sulphone and mixtures thereof.

To carry out the process according to the invention, the reaction components are kept at temperatures from 0 to 450° C. for periods ranging from a few minutes up to several hours, optionally in the presence of a solvent. In some instances, it is of advantage to carry out the reaction in several stages. Thus, the first stage can be controlled to give an adduct or condensate which is then converted into the high molecular weight polyimide at elevated temperatures, optionally through chain extension or crosslinking. In some instances, it is of advantage to carry out the reaction in the presence of an inert protective gas such as nitrogen or argon.

In general, the quantitative ratios between the reactants are as nearly as possible equivalent in order to obtain high molecular weights, although deviations from the stoichiometric ratios are possible. The course of the reaction can be accelerated by suitable catalysts, for example by boron fluoride and its adducts, zinc chloride, stannous chloride, ferric chloride, triethylene diamine, zinc octoate, dialkyl tin diacylates, titanium tetrabutoxide and lead oxide.

The polyimides that can be obtained by the process according to the invention are distinguished by their outstanding resistance to high temperatures and are suitable for use as lacquers, films and mouldings. Their properties may be varied within wide limits, depending upon the purposes for which they are to be used, by the addition of fillers, pigments and components of low and high molecular weight, for example by admixture with terephthalic acid polyesters for the production of wire lacquers.

The following examples are to further illustrate the invention without limiting it.

EXAMPLE 1

125 g. of diphenyl methane-4,4'-diisocyanate and 31 g. of ethylene glycol are heated for 1 hour at 100° C. in 300 cc. of toluene. The solution is then cooled to 30° C., followed by the addition of 96 g. of trimellitic acid anhydride, 18 g. of glycerol, 0.1 g. of lead oxide, 0.2 g. of zinc octoate and 700 g. of cresol. This mixture is then heated to 200° C. over a period of about 3 hours, during which the toluene is distilled off through a distillation bridge, and then kept at this temperature until no more carbon dioxide escapes. A clear, elastic film is obtained from the solution thus prepared at 200° C. and 290° C.

EXAMPLE 2

79.6 g. of bis(butoxycarbonylamine phenyl)-methane and 38.4 g. of trimellitic acid anhydride are heated for 10 hours at 190° C. with 0.5 g. of zinc octoate in 470 g. of cresol. The butanol formed during the reaction is distilled off through a distillation bridge. The reaction is at an end when no more carbon dioxide is given off. A viscous solution of the polyamide imide is obtained, and is coated on to a glass plate and stoved initially at 200° C. and then at 280° C. to form a clear, brown lacquer film. The infra-red spectrum shows the bands characteristic of the amide group at 1662 cm.$^{-1}$, and the bands characteristic of the imide group at 1712 and 1775 cm.$^{-1}$.

EXAMPLE 3

63.2 g. of 4,4'-bis-(methoxycarbonylamino)-diphenyl ether and 43.6 g. of pyromellitic acid dianhydride are heated for 12 hours at 190° C. in 250 g. of cresol. The polyimide is obtained in the form of a yellow powder which is suction filtered and washed with methanol. The yield comprises 71 g.

$C_{22}H_{10}N_2O_5)_n$ $(382.3)_n$: Calc'd (percent): C, 69.1; H, 2.6; N, 7.3. Found (percent): C, 68.9; H, 2.7; N, 7.5.

EXAMPLE 4

329 g. of n-butyl alcohol in 30 cc. of toluene are added dropwise at a maximum of 30° C. to a solution of 750 g. of diphenyl methane-4,4'-diisocyanate in 700 cc. of toluene. The mixture is then stirred for 1 hour at 100° C. and cooled, and 1326 g. of cresol and 576 g. of trimellitic acid anhydride are added to it. The temperature is gradually increased to 200° C., the butanol and toluene being simultaneously distilled off, and the mixture is stirred at this temperature until the evolution of carbon dioxide has stopped. A clear film of lacquer is obtained after coating on to a metal plate and stoving first at 200° C. and then at 280° C.

EXAMPLE 5

34.8 g. of tolylene-2,4-diisocyanate and 30 g. of n-butanol are heated for 2 hours at 90° C. in 360 g. of phenol. 62 g. of bis-trimellitic acid anhydride glycol ester are then added and the mixture is stirred at 180° C. until no more carbon dioxide is given off. The lacquer solution thus prepared is coated on to a metal plate and stoved first at 190° C. and then at 280° C. to form a clear, hard layer of lacquer. The infra-red spectrum shows the bands characteristic of imides at 1715 and 1778 cm.$^{-1}$ and those characteristic of esters at 1738 cm.$^{-1}$.

EXAMPLE 6

16.8 g. of hexamethylene diisocyanate, 16.0 g. of phenylene-1,3-diisocyanate, 11.8 g. of hexane diol and 6.2 g. of ethylene glycol are heated for 1 hour at 100° C. in 300 g. of cresol. 43.6 g. of pyromellitic acid dianhydride, 14.6 g. of adipic acid and 0.3 g. of lead oxide are then introduced and the mixture is kept at 190° C. until a viscous solution has formed. After stoving on a glass plate first at 200° C. and then at 270° C., a brown, hard film of lacquer is obtained.

EXAMPLE 7

25 g. of diphenyl propane-4,4'-diisocyanate and 6.5 g. of ethylene glycol are stirred for 1 hour at 60° C. in 200 cc. of dimethyl acetamide. 21.8 g. of pyromellitic acid dianhydride are then introduced, followed by heating for 5 hours at 160° C. The reaction mixture is coated on to a glass plate and stoved at 250° C. to form a clear, hard lacquer film.

EXAMPLE 8

25 g. of ethylene glycol are added dropwise to a solution of 100 g. of diphenyl methane-4,4'-diisocyanate in 279 g. of cresol, followed by stirring for 2 hours at 100° C. After cooling, 154 g. of trimellitic acid anhydride are introduced and the mixture is heated for 20 hours to 190° C. A brown viscous solution is obtained and is mixed with 100 g. of a polyester of terephthalic acid, ethylene glycol and glycerol and 280 g. of cresol, and the resulting mixture is stoved on a glass plate initially at 200° C. and then at 290° C. to form a clear, elastic lacquer film.

EXAMPLE 9

23 g. of ethanol are added dropwise to a solution of 69 g. of an isocyanate mixture which is obtained by condensing aniline with formaldehyde, followed by phosgenation, and which has an isocyanate content of 30.5%, in 330 g. of cresol. Stirring is continued for 1 hour at 75° C., 96 g. of trimellitic acid anhydride are then introduced and the resultaing mixture is heated for 20 hours at 190 C. A brown viscous solution is formed which is stoved on a glass plate at 200° C. and 290° C. to form a hard, elastic film of lacquer.

What we claim is:

1. A process for the production of high molecular weight polyimides which comprises reacting a carbamic acid ester having no free NCO groups with a cyclic dicarboxylic acid anhydride, said reacting being effected at temperatures of from 0 to 450° C., with the proviso that when one or both of said ester and said anhydride are monofunctional, at least one other functional group is present in each of the monofunctional components, said group being able to undergo poly-condensation or poly-addition reactions and being selected from the group consisting of (—NH—CO—OR$_2$), OH, COOH, and COOR$_4$, wherein R$_2$ represents an aliphatic or aliphatic-aromatic radical, and wherein R$_4$ represents an aliphatic, aliphatic-aromatic or aromatic radical.

2. The process of claim 1, said carbamic acid ester having the general formula

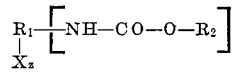

wherein

R$_1$ represents a $(z+1)$-valent aliphatic, aliphatic-aromatic or aromatic radical, R$_2$ represents an aliphatic or aliphatic-aromatic radical, z represents 1 or 2 and X is a grouping selected from the group consisting of ⎨NH—CO—O—R$_2$⎬, —OH, —COOH, and —COOR$_4$, wherein R$_4$ represents an aliphatic, aliphatic-aromatic or aromatic radical, and said cyclic dicarboxylic acid anhydride having the general formula

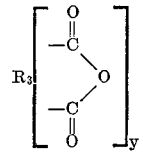

wherein R$_3$ represents a 2 y-valent aliphatic, aliphatic-aromatic or aromatic radical containing one or more additional functional groups that are able to undergo polycondensation or polyaddition reactions, any y represents an integer from 1 to 3.

3. The process of claim 1, said reacting being carried out in the presence of a solvent.

4. The process of claim 1, wherein said carbamic acid ester is the reaction product of an organic diisocyanate and an at least molar amount of an aliphatic glycol having from 2 to 6 carbon atoms, and wherein said cyclic dicarboxylic acid anhydride is trimellitic acid anhydride.

5. The process of claim 4, wherein said organic diisocyanate is an aromatic diisocyanate.

6. The process of claim 5 wherein said aromatic diisocyanate is 4,4'-diphenyl methane diisocyanate.

7. The process of claim 5, wherein said aromatic diisocyanate is 2,4-toluylene diisocyanate.

References Cited

UNITED STATES PATENTS 3,317,480   5/1967   Fetscher et al. _____ 260—77.5

DONALD E. CZAJA, Primary Examiner

M. J. WELSH, Assistant Examiner

U.S. Cl. X.R.

260—18, 47, 75